(12) United States Patent
Sarcone et al.

(10) Patent No.: US 10,089,266 B2
(45) Date of Patent: Oct. 2, 2018

(54) POWER SAVING FEATURE FOR STORAGE SUBSYSTEMS

(71) Applicant: Apple Inc., Cupertino, CA (US)

(72) Inventors: Christopher J. Sarcone, Saratoga, CA (US); Manoj K. Radhakrishnan, Fremont, CA (US); Etai Zaltsman, Ramat-Hasharon (IR)

(73) Assignee: Apple Inc., Cupertino, CA (US)

( * ) Notice: Subject to any disclaimer, the term of this patent is extended or adjusted under 35 U.S.C. 154(b) by 516 days.

(21) Appl. No.: 14/797,041

(22) Filed: Jul. 10, 2015

(65) Prior Publication Data

US 2017/0010992 A1  Jan. 12, 2017

(51) Int. Cl.
  *G06F 13/26* (2006.01)
  *G06F 1/32* (2006.01)

(52) U.S. Cl.
  CPC .......... *G06F 13/26* (2013.01); *G06F 1/3275* (2013.01); *Y02B 60/1228* (2013.01); *Y02D 10/14* (2018.01)

(58) Field of Classification Search
  None
  See application file for complete search history.

(56) References Cited

U.S. PATENT DOCUMENTS

| | | | |
|---|---|---|---|
| 8,478,924 B2 | 7/2013 | Ahmad et al. | |
| 8,566,494 B2 | 10/2013 | Li et al. | |
| 9,378,049 B1* | 6/2016 | Johnson | G06F 9/467 |
| 2007/0130387 A1* | 6/2007 | Moore | G06F 13/20 |
| | | | 710/40 |
| 2013/0185482 A1* | 7/2013 | Kim | G06F 3/0605 |
| | | | 711/103 |
| 2013/0262649 A1* | 10/2013 | Shimmitsu | H04L 41/5022 |
| | | | 709/223 |
| 2014/0195708 A1 | 7/2014 | Klein et al. | |
| 2014/0359185 A1 | 12/2014 | Swal et al. | |
| 2015/0019765 A1 | 1/2015 | Kegel | |

* cited by examiner

*Primary Examiner* — Farley Abad
*Assistant Examiner* — Dayton Lewis-Taylor
(74) *Attorney, Agent, or Firm* — Dickinson Wright RLLP

(57) ABSTRACT

Disclosed herein is a technique for maintaining a responsive user interface for a user while preserving battery life of a user device by dynamically determining the interrupt rate/interrupt time at the user device. Based on priority tier information associated with the I/O requests along with the directionality and size of the I/O requests, a determination can be made regarding how the interrupt rate/interrupt time can be adjusted to achieve acceptable user interface (UI) responsiveness and maximum power savings.

20 Claims, 5 Drawing Sheets

POWER SAVING FEATURE FOR STORAGE SUBSYSTEMS

FIELD

The described embodiments set forth a technique for maintaining a responsive user interface for a user while preserving battery life of a user device.

BACKGROUND

Generally, hardware controllers utilize a technique called "interrupt coalescing" in which an interrupt rate can be modified based on statically assigned parameters. In particular, two types of static assigned parameters are utilized where the interrupt to the CPU is signaled when a certain number of input/output requests have been completed or when a certain period of time has elapsed after an I/O request has been marked as completed.

Typically, interrupt coalescing is enabled on high-end servers to enable the servers to process more I/O requests per second. With high interrupt rates, the CPU spends a large amount of time performing context saves and restores that are required to transition into and out of the interrupt mode. This can result in a considerable amount of power to be consumed to keep the CPU in an active or powered state. Notably, in client-based systems it is desirable to reduce power consumption in order to preserve battery life. Consequently, there is a need for a technique for dynamically modifying the interrupt rate in order to save power for the client-based systems.

SUMMARY

Representative embodiments set forth herein disclose various techniques for dynamically determining/modifying an interrupt rate/interrupt time at a user device in order to preserve battery life of the user device. In particular, the rate at which interrupts are generated at the user device is modified based on a number of dynamic parameters (e.g., a number of outstanding I/O requests, directionality associated with the I/O requests, the size of the I/O requests, and a priority tier associated with the I/O requests). By dynamically modifying the interrupt rate/interrupt time, the time the CPU spends in a low power state can be maximized resulting in significant power savings. For example, when an I/O request associated with a low priority tier is received, the processing of the I/O request and the servicing of the interrupt at completion of the I/O request can be delayed. In case the CPU is already in a low power state, the CPU need not be brought into an active power state for such an I/O request. In other words, the CPU can stay in the low power state for a longer period of time, thereby resulting in power savings.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings that illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth techniques for maintaining a responsive user interface (UI) for a user while preserving battery life of a user device by modulating the interrupt rate/interrupt time dynamically at the user device. A determination can be made, based on priority tier information associated with the I/O requests along with the directionality and size of the I/O requests, regarding how the interrupt rate/interrupt time can be adjusted to achieve acceptable UI responsiveness and maximum power savings. For example, an interrupt associated with a read I/O request that is associated a highest priority tier is serviced immediately because a process/application (that requires assets from a storage subsystem to draw the UI) is waiting for the read I/O request to complete. By minimizing the time spent for processing the high priority read I/O request, the responsiveness of the UI can be enhanced. Also, servicing of an interrupt associated with an I/O request that is associated with a lower priority tier can be delayed. This allows the time the CPU spends in a low power state to be maximized resulting in significant power savings.

Accordingly, the techniques described herein provide a mechanism for adjusting an interrupt rate/interrupt time at a user device based on a number of dynamic parameters. A more detailed discussion of these techniques is set forth below and described in conjunction with FIGS. 1-2, 3A-3D, and 4-5, which illustrate detailed diagrams of systems and methods that can be used to implement these techniques.

Figure 1:
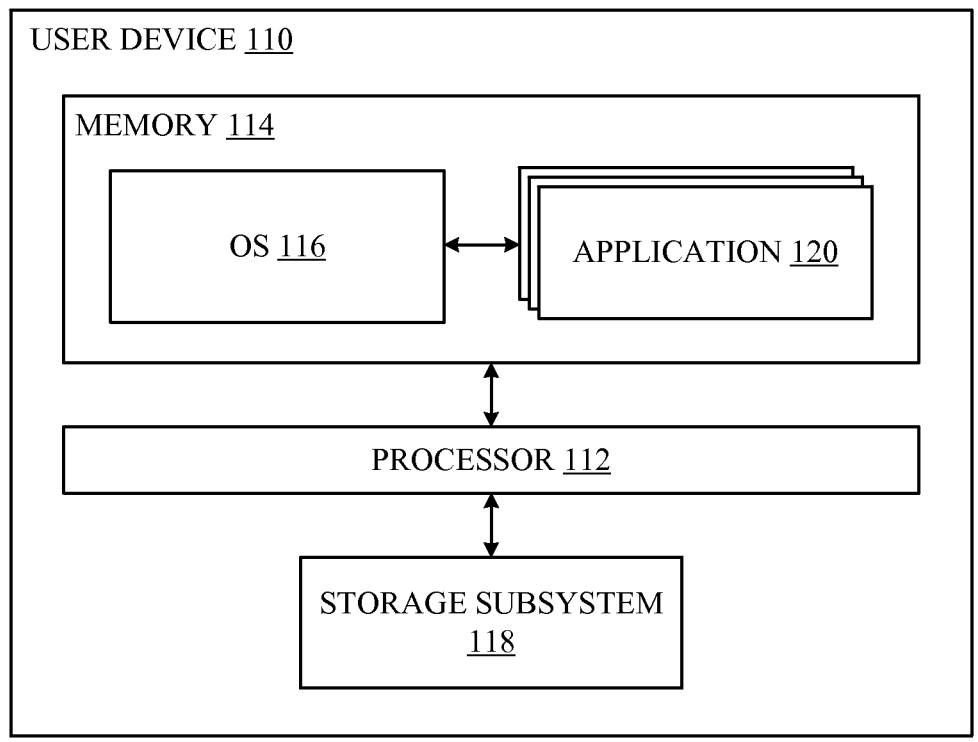
FIG. 1 illustrates a block diagram of different components of a system configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes a user device 110 that can represent a computing device (e.g., an iMac®, a MacBook®, MacBook Pro®, or other any other computing device by Apple®). A processor (or CPU) 112, in conjunction with the memory 114, can implement an operating system (OS) 116 (e.g., iOS, Mac OS, or any other operating system) that is configured to execute various applications 120 (e.g., native OS applications and user applications) and other processes/services on the user device 110. The storage subsystem 118 can include different types of storage devices (e.g., solid state drives (SSDs), NAND-based non-volatile storage devices, and/or any other types of storage devices). The storage subsystem 118 can include any type of storage device/system provided that the firmware associated with the storage subsystem 118 is capable of utilizing the dynamic parameters to determine the interrupt rate/interrupt time.

Figure 2:
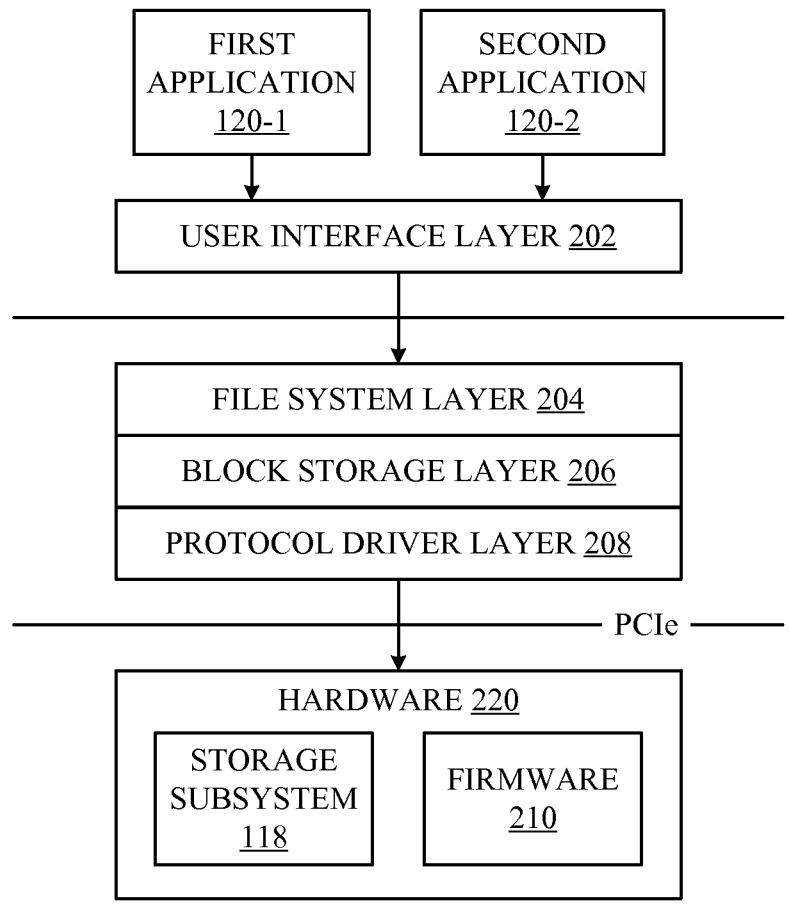
FIG. 2 illustrates a block diagram of different layers of an operating system implemented at a user device of FIG. 1, according to some embodiments.

The OS 116 can be represented by a number of software layers in an OS stack 200, each of which performs a specific task. As shown in FIG. 2, the OS 116 can include a user interface layer 202, a file system layer 204, a block storage layer 206, and a protocol driver layer 208. The user interface layer 202 includes a number of applications 120 (e.g., first application 120-1 and second application 120-2), allows a user to interact directly with the OS 116 by enabling selections of the applications, and presents various graphical user interface (GUI) elements that can be manipulated by the user. The file system layer 204 handles storage of data files, applications, and files associated with the OS 116, and presents a file and directory abstraction of the storage subsystem 118 to the OS 116. The block storage layer 206 presents a block level abstraction of the storage subsystem 118 to higher levels of abstraction. The protocol driver layer 208 includes drivers that enable the OS 116 to interact with user device hardware (including the storage subsystem 118 and/or firmware 210 that operates the storage subsystem 118 (shown in FIG. 2 as hardware 220)). According to some embodiments, the file system layer 204, block storage layer 206, and the protocol driver layer 208, represent the kernel of the OS. The kernel can manage input/output (I/O) requests from applications 120-1, 120-2 or other processes running at the user interface layer 202 and can translate them into instructions/commands for the processor 112, the storage subsystem 118, and/or other components of the user device 110.

According to some embodiments, the applications running at the user interface layer 202 can be assigned different priorities based on the type of operations performed at/by the application. For example, a foreground application that the user is directly interacting with or is perceptible to the user can be assigned a higher priority than a background application that is running in the background, and is not being actively used by the user or does not require direct interaction with the user (i.e., the background application can be assigned a lower priority than the foreground application). Examples of background applications can include an application that performs indexing operations in the background, an application that generates previews for documents in the background, an application that backs up data and communicates the data to a cloud-based storage system, and the like.

According to some embodiments, different priority tiers/levels (e.g., "tier 0", "tier 1", "tier 2", and "tier 3") can be assigned to different applications, where "tier 0" represents a highest priority level and "tier 3" a lowest priority level. The foreground application can be assigned a "tier 0" priority tier whereas the background application can be assigned a "tier 3" priority tier. Other medium priority applications can be assigned "tier 1" or "tier 2" priority tiers, where an application assigned a "tier 1" priority tier has higher priority than an application assigned a "tier 2" priority tier. The medium priority applications can represent applications that are active but are not foreground applications (i.e., are not applications that the user is directly interacting with). According to some embodiments, a particular application can request that all I/O requests issued by the application be assigned a particular priority level (e.g., "tier 0" priority tier). In some other embodiments, a scheduler implemented at the user device 110 can automatically assign priority tiers to the applications/I/O requests issued by the applications. According to some embodiments, the I/O requests issued by foreground applications need to be serviced/completed with low latency whereas servicing/completion of the I/O requests issued by other medium or low priority applications can be delayed without affecting the responsiveness of the UI. The user device 110 can seem responsive to the user when I/O requests are serviced within 16 ms that represents a frame rate of 60 frames/second for a graphics subsystem of the user device 110. Although four priority tiers have been described herein, greater or fewer priority tiers can be utilized as would be appreciated.

According to some embodiments, when an application (e.g., first application 120-1 or second application 120-2) running on the user interface layer 202 is launched, the application issues an I/O request that travels through the various layers of the OS stack 200 to the storage subsystem 118. The first application 120-1 can represent the foreground application and the second application 120-2 can represent the background application. Because the first application 120-1 represents the foreground application, any I/O requests issued by the first application 120-1 are assigned a "tier 0" priority tier as well. Similarly, any I/O requests issued by the second application 120-2 are assigned a "tier 3" priority tier. According to some embodiments, in order to enhance the responsiveness of the UI for the user, the I/O requests issued by the foreground applications (e.g., "tier 0" I/O requests) are completed before any other lower priority I/O requests (e.g., "tier 3" I/O requests).

According to some embodiments, directionality of the I/O requests issued by the applications (e.g., first application 120-1, second application 120-2) running at the user interface layer 202 is determined. In other words, a determination is made regarding whether an I/O request is a read I/O request or a write I/O request. According to some embodiments, because a read I/O request represents a read system call that has a thread waiting for the I/O request to complete (i.e., the associated application is waiting for the read I/O request to complete), the read I/O request can be assigned higher priority than the write I/O operation (where the associated application is not waiting for the write I/O operation to complete because data is typically written asynchronously from the buffer cache). For example, when the first application 120-1 is launched, every asset that is required by the first application 120-1 causes a read I/O request to be issued, where the read I/O request has to be serviced/completed promptly to ensure that the responsiveness of the UI does not suffer. For example, certain scenarios that can cause read requests to be issued can include: 1) when the first application 120-1 presents an open-save dialog box that requires an icon to be read from the storage subsystem 118, or 2) when the first application 120-1 presents a window to the user, where scrolling by the user requires some element that was out-of-window scope to be loaded in real time. These scenarios represent instances where multiple dependent read I/O requests can be issued and these read I/O requests need to be serviced/completed promptly. According to some embodiments, because the read I/O requests are issued by the foreground application (i.e., first application 120-1), the read I/O requests can be assigned a "tier 0" priority tier. As will be appreciated, a "tier 0" read I/O request is considered to have a higher priority than a "tier 0" write I/O request because the first application 120-1 is waiting for the read I/O request to complete. In other words, read I/O requests associated with a particular priority tier are considered to have a higher priority than write I/O requests associated with the same priority tier.

Referring back to FIG. 2, the priority tier information associated with the applications and/or the I/O requests issued by the applications is passed through the various layers of the OS stack 200. The protocol driver layer 208 translates an I/O request into an I/O command that the firmware 210 (operating the storage subsystem 118) understands. The protocol driver layer 208 encapsulates the priority tier information associated with the I/O request in the I/O command. In other words, the priority tier information is embedded into the I/O command that is communicated to the firmware 210/storage subsystem 118. The I/O command can be communicated over a PCIe bus or other communication interface that enables communication between the drivers in the protocol driver layer 208 and the storage subsystem 118. The firmware 210 receives the I/O commands associated with the various applications 120 and adds the I/O commands to an I/O processing queue 302, described in greater detail with respect to FIGS. 3A-3D.

Typically, interrupt coalescing is based on statically assigned interrupt coalescing parameters that indicate that the interrupt to the processor 112 can be signaled when a certain number of I/O commands have been completed or when a certain period of time has elapsed after an I/O command has been marked as completed. In a scenario where: 1) the number of I/O commands parameter is set to four, 2) the time parameter is set to 25 ms, 3) there are three I/O commands in the I/O processing queue 302, and 4) the three I/O commands have been processed; a penalty of 25 ms has to be accepted because the number of I/O commands parameter is not met. In other words, when the first I/O command of the three I/O commands is completed, a timer is set to 25 ms, and a penalty time including the amount of time it took for the first I/O command to be processed plus the 25 ms has to be accepted. Thus, the interrupt is not issued to the processor 112 until the penalty time has elapsed. This causes the issuer of the I/O request to observe a delay in the processing of I/O requests. This delay results in a poor user experience for "tier 0" I/O requests.

However, various embodiments described herein disclose techniques wherein the firmware 210 can dynamically determine/adjust an interrupt rate/interrupt time for the I/O commands. The interrupt time indicates when the interrupt can be generated for the I/O command and is based on the priority tier information associated with the outstanding I/O commands, the directionality of the outstanding I/O commands, and/or the size of the outstanding I/O commands. In other words, the firmware 210 can determine when interrupt coalescing is to be enabled and/or what the dynamic interrupt coalescing parameters (e.g., interrupt coalescing timer or interrupt time) need to be. For example, for outstanding "tier 0" read I/O commands, interrupt coalescing is not enabled because these commands need to be serviced promptly (e.g., without the 25 ms delay that is incurred in the case of statically assigned parameters), whereas for outstanding "tier 3" read I/O commands, interrupt coalescing is enabled because servicing of these commands can be delayed. Moreover, the interrupt coalescing timer for the "tier 3" read I/O commands can be set at a contractual timer value T3 associated with the "tier 3" priority tier thereby delaying the interrupt time by T3. The interrupt coalescing timer for the "tier 1" and "tier 2" commands can similarly be set to their corresponding contractual timer values (e.g., T1 and T2, respectively). According to some embodiments, T1 can be 10 ms, T2 can be 20 ms, and T3 can be 30 ms, although other contractual timer values can be utilized as will be appreciated. According to some embodiments, the lower priority "tier 1, "tier 2" or "tier 3" commands can have a deeper queue depth than the "tier 0" commands. According to some embodiments, the logic for dynamically determining the interrupt rate/interrupt time can be implemented at the protocol driver layer 208 or by a pre-fetching engine that is implemented by the hardware 220 of the user device 110. By implementing the logic in the firmware 210, the PCIe link can stay in a low power state for a longer period of time because the protocol drivers at the protocol driver layer 208 need not wake the PCIe link to perform hardware register writes.

FIGS. 3A-3D illustrate a series of operations 300 carried out for processing I/O requests issued by applications 120 running at the user interface layer 202. When the protocol driver layer 208 issues I/O commands to the firmware 210, all the I/O commands are queued by the firmware 210 in the I/O processing queue 302. The exemplary I/O commands depicted in FIG. 3A can include a first I/O command 304 (with tag 5) corresponding to a first read I/O request (i.e., a "tier 3" read I/O request) from the second application 120-2, a second I/O command 306 (with tag 17) corresponding to a second read I/O request (i.e., a "tier 0" read I/O request) from the first application 120-1, and a third I/O command 308 (with tag 22) corresponding to a third read I/O request (i.e., a "tier 3" read I/O request) from the second application 120-2. According to some embodiments, the firmware 210 can scan the I/O processing queue 302 to determine that there are three outstanding I/O commands in the I/O processing queue 302. The firmware 210 can further scan the I/O processing queue 302 to determine whether a "tier 0" I/O command exists in the I/O processing queue 302. In response to a determination that a "tier 0" I/O command exists, the firmware 210 initiates processing of the "tier 0" I/O command (e.g., second I/O command 306) before processing the other I/O commands. In response to a determination that a "tier 0" I/O command does not exist, the firmware 210 initiates processing of the outstanding I/O commands in the I/O processing queue 302 based on their assigned priority tiers, their directionality, and/or their size.

Figure 3A:
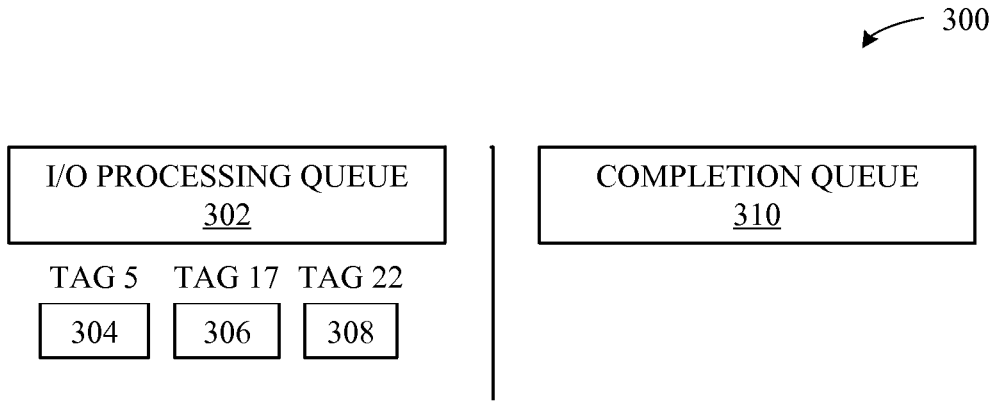
FIGS. 3A-3D illustrate a series of operations carried out for processing I/O requests issued by applications running at the user device of FIG. 1, according to one embodiment.
Figure 3B:
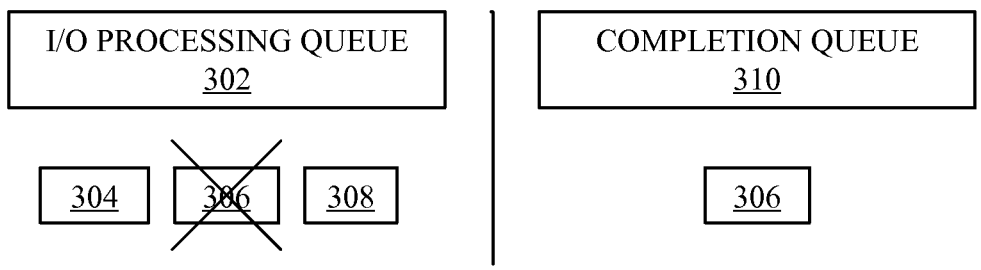

According to some embodiments, when the "tier 0" I/O command is a read I/O command (i.e., an I/O command corresponding to a read I/O request), the firmware 210 communicates the "tier 0" read I/O command (e.g., second I/O command 306) to the storage subsystem 118 requesting the storage subsystem to read data corresponding to the read I/O command. The storage subsystem 118, after a certain period of time (e.g., 40 µs), indicates that it has data to transfer and the data transfer is initiated, where the data is communicated via the PCIe bus and across the various layers of the OS stack 200 to the first application 120-1. After the data transfer is complete, the firmware 210 writes to a hardware register (implemented and maintained by the firmware 210) indicating that the second I/O command 306 can be completed. As part of the hardware register write, the firmware 210 can indicate that this second I/O command 306 is to be completed promptly without delay (i.e., a delay of 0 ms). In other words, the interrupt time is set to indicate no delay and an interrupt coalescing timer is not started. According to some embodiments, the firmware 210 retires the second I/O command 306 in the I/O processing queue 302 and adds the second I/O command 306 to a completion queue 310, as depicted in FIG. 3B, for example. After the hardware register is written and the entry is added to the completion queue 310, the firmware 210 issues a first completion interrupt associated with the second I/O command 306 to the processor 112 that implements the OS 116. The first completion interrupt causes the second I/O command 306 to be completed promptly without delay.

Figure 3C:
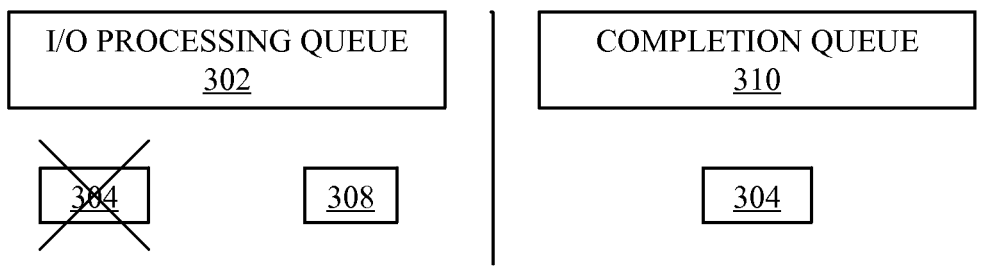

According to some embodiments, the firmware 210 can scan the I/O processing queue 302 to determine that there are two outstanding I/O commands in the I/O processing queue 302. The firmware 210 can further scan the I/O processing queue 302 to determine that two "tier 3" I/O commands (e.g., first I/O command 304 and third I/O command 308) are outstanding in the I/O processing queue 302. Assuming that the first and third I/O commands 304/308 are read I/O commands, the firmware 210 initiates processing of the I/O command that was added to the I/O processing queue 302 first (i.e., the processing is performed based on the order in which the I/O commands are received). Because the first I/O command 304 was added to the I/O processing queue 302 before the third I/O command 308, the firmware 210 initiates processing the first I/O command 304. The firmware 210 processes the first I/O command 304 in a manner similar to the processing of the second I/O command 306 described above, except as part of the hardware register write, the firmware 210 can indicate that completion of the first I/O command and generation of a second completion interrupt for the first I/O command 304 can be delayed by a certain amount of time (e.g., T3 that corresponds to the contractual time value for "tier 3" I/O commands). In other words, the interrupt time is set to indicate an acceptable delay of T3. An interrupt coalescing timer is started, the first I/O command 304 is retired in the I/O processing queue 302, and the first I/O command 304 is added to the completion queue 310, as depicted in FIG. 3C. As can be seen in FIG. 3C, the entry associated with second I/O command 306 is removed from the completion queue 310 as the second I/O command 306 was promptly serviced at some point after the first completion interrupt was issued. According to some embodiments, the second completion interrupt is not issued for the first I/O command 304 until a timeout occurs or more I/O commands are completed.

Figure 3D:
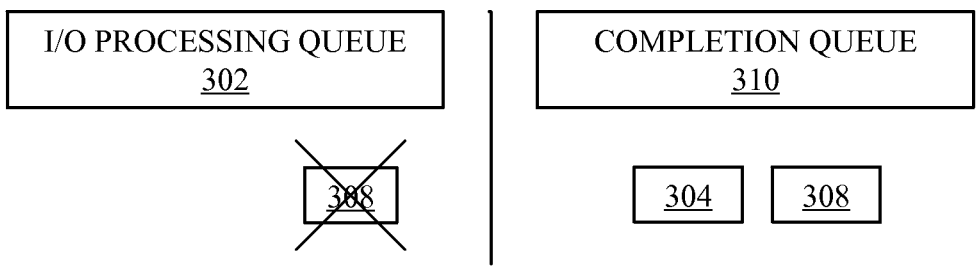

According to some embodiments, the firmware 210 can scan the I/O processing queue 302 to determine that there is one outstanding third I/O command 308 (that is a "tier 3" read I/O command) in the I/O processing queue 302. Accordingly, the firmware 210 initiates processing of the third I/O command 308. The firmware 210 processes the third I/O command 308 in a manner similar to the processing of the first I/O command 304 described above, where as part of the hardware register write, the firmware 210 can indicate that completion of the third I/O command and generation of a third completion interrupt for the third I/O command 308 can be delayed by T3. An interrupt coalescing timer need not be started for the third I/O command 308 because the timer that was started for the first I/O command 304 is already active. The third I/O command 308 is retired in the I/O processing queue 302, and the third I/O command 308 is added to the completion queue 310, as depicted in FIG. 3D. As can be seen in FIG. 3D, the completion queue 310 includes entries for both the first I/O command 304 and the third I/O command 308 because a second or third completion interrupt was not issued for the first and third I/O commands 304/308. According to some embodiments, when a timeout occurs (i.e., the timer is triggered), a combined completion interrupt is issued to the processor 112 that causes both the first and third I/O commands 304/308 to be completed.

According to some embodiments, if a new "tier 0" read I/O command is received while the first I/O command 304 is being processed, the processing of the first I/O command 304 is completed and a timer is set at T3. At this point, the firmware 210 scans the I/O processing queue 302, determines that there are two outstanding I/O commands in the I/O processing queue 302, and further determines that a new "tier 0" read I/O command exists in the I/O processing queue 302. The firmware 210 initiates processing of the "tier 0" read I/O command before the third I/O command 308 is processed. As part of the hardware register write, the firmware 210 indicates that the new I/O command is to be completed promptly without delay. The firmware 210 retires the new I/O command in the I/O processing queue 302, adds the new I/O command to the completion queue 310, and issues a completion interrupt associated with the new I/O command to the processor 112 that causes the new I/O command to be promptly completed. The completion interrupt causes the first I/O command 304 to be completed along with the new I/O command even though the first I/O command 304 was marked for delayed completion. The processing of the third I/O command 308 can then be initiated after the processing of the new I/O command is completed.

According to some embodiments, the size of the outstanding I/O commands can also be used as one of the parameters (in addition to the priority tier information associated with the outstanding I/O commands and the directionality of the outstanding I/O commands, for example) to determine the interrupt rate/interrupt time for the outstanding I/O commands. For instance, if the I/O command represents a small (e.g., 4K) random read I/O command coming from a VM system to service a page fault for a chunk of application code, the I/O command can be serviced as fast as possible. However, if the I/O command represents a large (e.g., 128K) read I/O command, a large amount of time may be already spent to transfer data for the read, and it might be acceptable to dynamically adjust/modify the interrupt time for the I/O command (e.g., delay the interrupt time by increasing the interrupt coalescing timer for the I/O command).

According to some embodiments, the dynamic adjustment of the interrupt rate/interrupt time can result in increasing the time the processor 112/CPU spends in a lower power state before an I/O command is completed. For example, for "tier 3" I/O commands, which do not carry a demand for the I/O command to be processed promptly, the processor 112 can stay in a lower power state for a longer period of time and need not be brought out of the lower power state frequently resulting in significant power savings. Also, when the completion interrupts for a number of I/O commands are grouped together, the completion interrupts can be pushed to the processor 112 on a less frequent basis that allows the PCIe link (over which the completion interrupts are communicated) to stay in a low power state for a longer period of time, which results in additional power savings. Moreover, the hardware 220 of the user device 110 can be allowed to enter a low power mode after it completes processing an I/O command and does not have any additional outstanding I/O commands to process that can further result in additional power savings. According to some embodiments, when the completion interrupts for I/O commands are aggregated, waking up of the PCIe link can be delayed until a certain time period has elapsed or a certain number of I/O commands have been completed (e.g. when all the I/O commands are "tier 3" I/O commands). According to some embodiments, when the processor 112 wakes up the PCIe link to send a new I/O command to the firmware 210/storage subsystem 118, a determination can be made that the processor 112 is no longer in the low power state (i.e., the processor 112 is in an active powered state) and the PCIe link is also no longer in the low power state. In this case, when the processor 112 and the PCIe link are up, the completion interrupts can be pushed to the processor 112, thereby causing the I/O commands (e.g., "tier 3" I/O commands) to be completed faster than the scenario in which the waking up of the PCIe link is delayed (until the certain number of I/O commands have been completed, for example) because waiting for an additional I/O command to complete may not cause the certain number of I/O commands parameter to be met. According to some embodiments, having the hardware 220 enter the low power mode can result in about 2-3 mW of power savings, keeping the PCIe link in a low power state can result in about 100 mW of power savings, and keeping the processor 112 in the low power state can result in significant power savings depending on the type of processor 112 implemented by the user device 110.

In this manner, better UI responsiveness is achieved for the highest priority "tier 0" I/O commands because these commands are completed without delay. At the same time, lower priority commands are allowed to stack up until a completion interrupt is issued that allows the PCIe link and/or the processor 112 to stay in a low power state for a longer period of time, thereby providing significant power savings.

Figure 4:
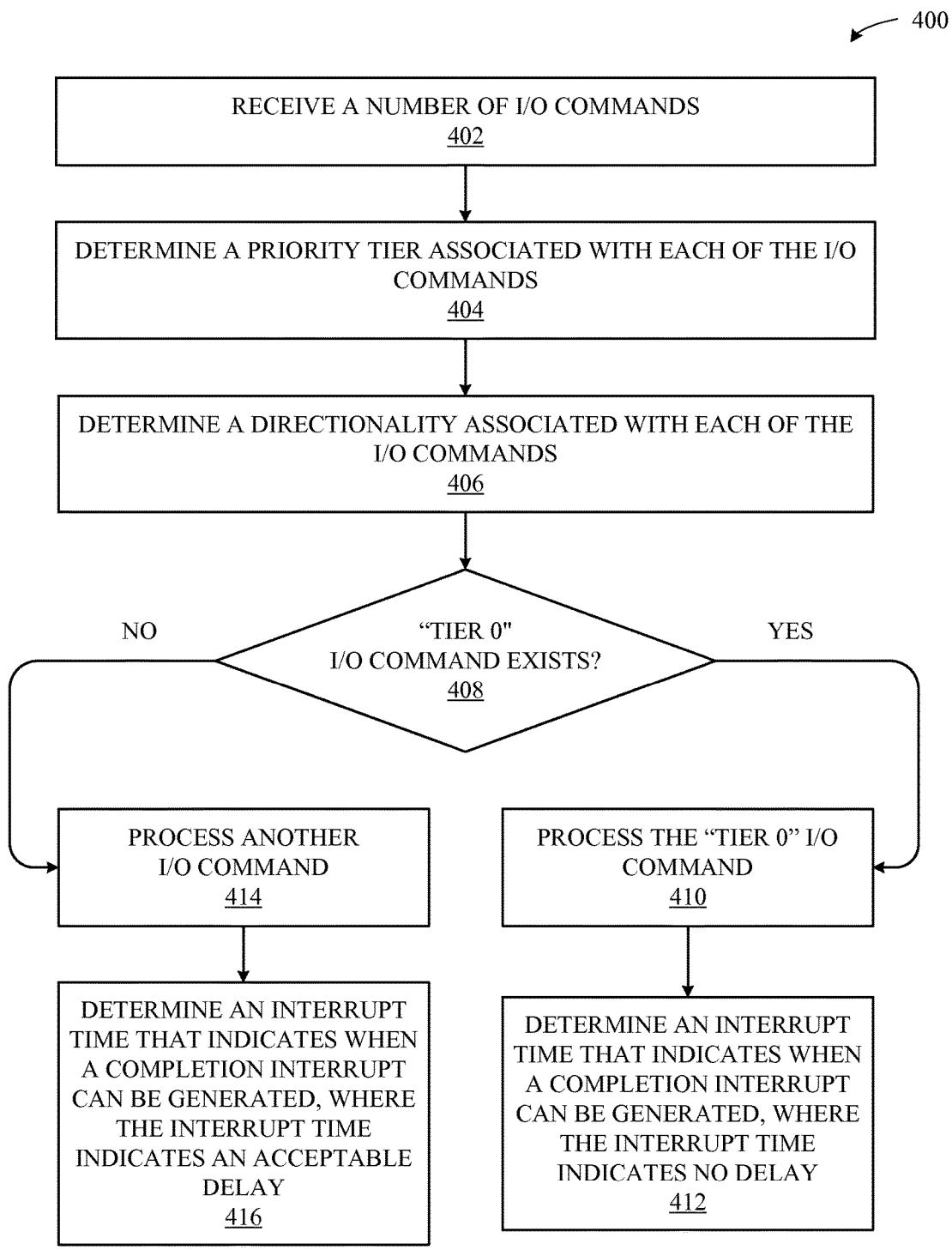
FIG. 4 illustrates a method for dynamically determining an interrupt time that is carried out by various components implemented by the user device of FIG. 1, according to one embodiment.

FIG. 4 illustrates a method 400 for dynamically determining the interrupt time for I/O commands that is carried out by the firmware 210 implemented by the user device 110 of FIG. 1, according to one embodiment. As shown, the method 400 begins at step 402, where the firmware 210 receives a number of I/O commands from the protocol driver layer 208. The firmware 210 adds the I/O commands to the I/O processing queue 302. According to some embodiments, priority tier information associated with an I/O command is embedded into the I/O command by the protocol driver layer 208. At step 404, the firmware 210 determines the priority tier associated with each of the I/O commands. The firmware 210 determines the priority tier associated with each I/O command based on the priority tier information embedded in the I/O command. At step 406, the firmware 210 determines the directionality associated with each of the I/O commands. In other words, the firmware 210 determines whether the I/O command is a read I/O command or a write I/O command.

At step 408, the firmware 210 determines whether a highest priority "tier 0" I/O command exists in the I/O processing queue 302. When a "tier 0" I/O command exists, the "tier 0" I/O command is promptly processed, at step 410.

At step 412, the firmware 210 determines an interrupt time that indicates when a completion interrupt for the "tier 0" I/O command can be generated or whether generation of the completion interrupt is to be delayed. According to some embodiments, the interrupt time indicates no delay in the generation of the completion interrupt for the "tier 0" I/O command. The completion interrupt for the "tier 0" I/O command is generated based on the determined interrupt time. In other words, the completion interrupt for the "tier 0" I/O command is generated without delay. According to some embodiments, the "tier 0" I/O command is processed based on the determined directionality of the "tier 0" I/O command. For example, a "tier 0" read I/O command is processed/completed before a "tier 0" write I/O command.

When no other "tier 0" I/O commands exist in the I/O processing queue 302 (i.e., all "tier 0" I/O commands have been processed/completed), the firmware 210 initiates processing of another particular I/O command from the I/O processing queue 302, at step 414. The remaining I/O commands (that are not "tier 0" I/O commands) in the I/O processing queue 302 are processed based on the priority tier and/or directionality associated with the I/O commands. For example, a "tier 1" I/O command is processed/completed before a "tier 2" or "tier 3" I/O command. Also, a "tier 1" read I/O command is processed/completed before a "tier 1" write I/O command, and so on.

At step 416, the firmware 210 determines an interrupt time that indicates when a completion interrupt for the particular I/O command being processed can be generated or whether the generation of the completion interrupt is to be delayed. According to some embodiments, the interrupt time indicates an acceptable delay in the generation of the completion interrupt for the particular I/O command. For example, the interrupt time can indicate an acceptable delay of T1 when a "tier 1" I/O command is being processed, an acceptable delay of T2 when a "tier 2" I/O command is being processed, and an acceptable delay of T3 when a "tier 3" I/O command is being processed. In other words, the acceptable delay corresponds to the contractual timer value associated with the respective priority tier. According to some embodiments, the completion interrupt for the particular I/O command is generated based on the determined interrupt time. In other words, the completion interrupt for a "tier 1" I/O command is generated after a delay of T1, the completion interrupt for a "tier 2" I/O command is generated after a delay of T2, and the completion interrupt for the "tier 3" I/O command is generated after a delay of T3. According to some embodiments, the generation of the completion interrupt for the particular I/O command can be delayed until a new I/O command arrives that indicates that the processor 112 is no longer in a low power state. In other words, the acceptable delay corresponds to an event (i.e., receipt of the new I/O command) that indicates that the processor 112 and/or the PCIe link is no longer in the low power state.

According to some embodiments, when the processing of the particular I/O command is complete, the firmware 210 scans the I/O processing queue 302 to determine whether any new "tier 0" I/O commands have been received such that the newly received "tier 0" I/O commands can be processed prior to resuming the processing of the remaining I/O commands (that are not "tier 0" I/O commands) in the I/O processing queue 302.

According to some embodiments, while the contractual timer values T1, T2, and T3 have been described as being associated with the priority tiers "tier 1", "tier 2", and "tier 3", respectively, different timer values for T1, T2, and T3 can be utilized based on the directionality (e.g., reads or writes) of the I/O commands at these priority tiers. The different timer values can account for an additional acceptable delay for completion of write I/O commands in comparison to read I/O commands. According to some embodiments, different timer values can be utilized based on the directionality of the I/O commands at each priority tier. For example, a T1-Read timer value and a T1-Write time value can be utilized for a "tier 1" read I/O command and "tier 1" write I/O command, respectively. Similarly, T2-Read and T2-Write timer values can be utilized at the "tier 2" priority tier, and so on. According to some embodiments, the firmware 210 and the hardware 220 can provide the ability to distinguish these different timer values and the firmware 210 can emulate these capabilities if hardware support is not provided.

Figure 5:
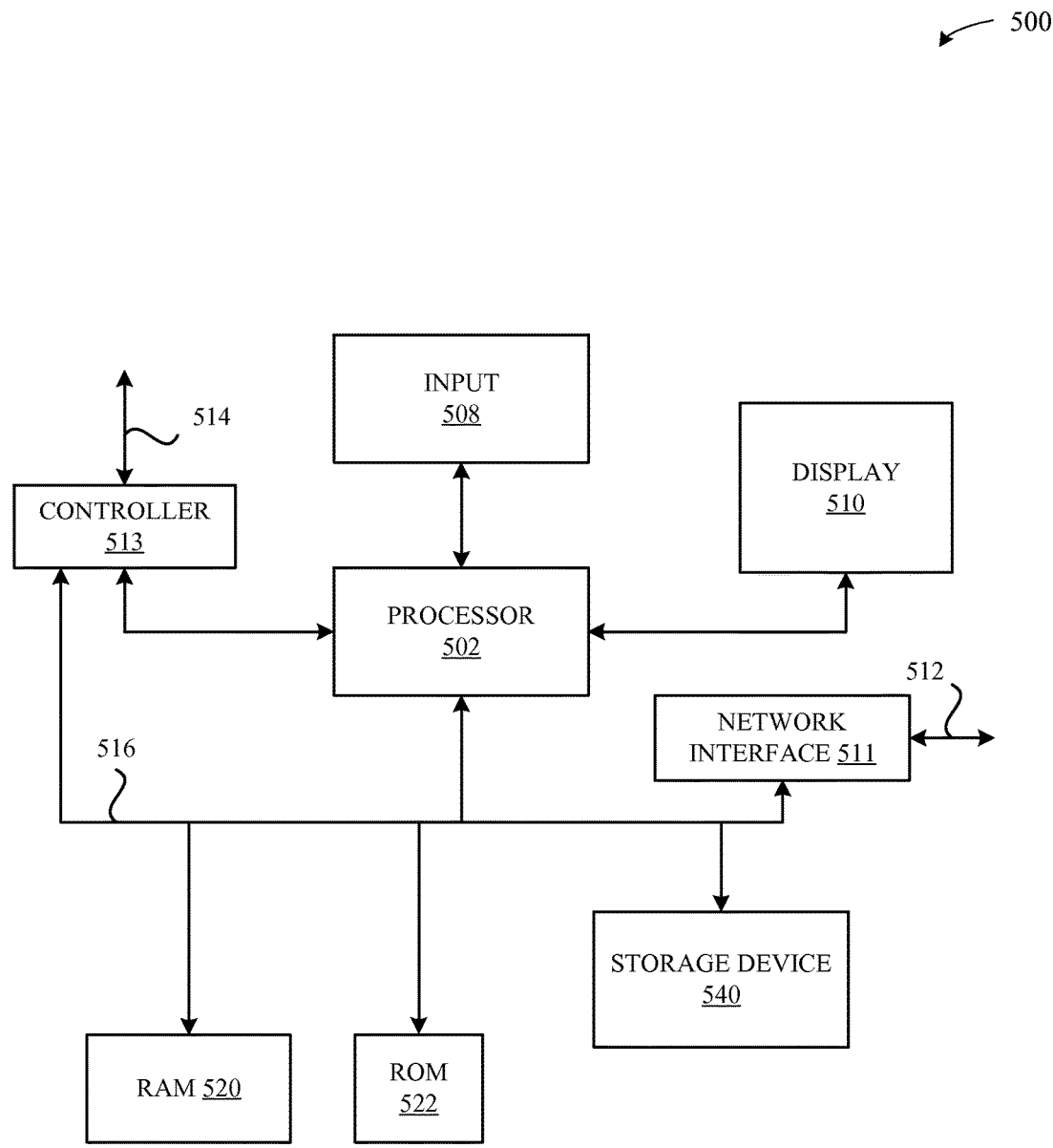
FIG. 5 illustrates a detailed view of a computing device that can be used to implement the various components described herein, according to some embodiments.

FIG. 5 illustrates a detailed view of a computing device 500 that can be used to implement the various components described herein, according to some embodiments. In particular, the detailed view illustrates various components that can be included in the user device 110 illustrated in FIG. 1. As shown in FIG. 5, the computing device 500 can include a processor 502 that represents a microprocessor or controller for controlling the overall operation of computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, etc. Still further, the computing device 500 can include a display 510 (screen display) that can be controlled by the processor 502 to display information to the user (for example, email interface described herein). A data bus 516 can facilitate data transfer between at least a storage device 540, the processor 502, and a controller 513. The controller 513 can be used to interface with and control different equipment through and equipment control bus 514. The computing device 500 can also include a network/bus interface 511 that couples to a data link 512. In the case of a wireless connection, the network/bus interface 511 can include a wireless transceiver.

The computing device 500 also include a storage device 540, which can comprise a single disk or a plurality of disks (e.g., hard drives), and includes a storage management module that manages one or more partitions within the storage device 540. In some embodiments, storage device 540 can include flash memory, semiconductor (solid state) memory or the like. The computing device 500 can also include a Random Access Memory (RAM) 520 and a Read-Only Memory (ROM) 522. The ROM 522 can store programs, utilities or processes to be executed in a non-volatile manner. The RAM 520 can provide volatile data storage, and stores instructions related to the operation of the computing device 500. The storage device 540 can represent/include the storage subsystem 118 of FIG. 1

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for dynamically determining interrupt times within a user device, the method comprising, at the user device:
receiving a plurality of input/output (I/O) commands, wherein each I/O command of the plurality of I/O commands is associated with respective priority tier information;
determining, for each I/O command of the plurality of I/O commands, a respective priority tier for the I/O command based on the respective priority tier information associated with the I/O command; and
when a first I/O command of the plurality of I/O commands is associated with a highest priority tier:
processing the first I/O command, and
determining a first interrupt time that indicates a first completion interrupt for the first I/O command is to be generated independent of any pre-defined delay of time.

2. The method of claim 1, further comprising:
determining, for each I/O command of the plurality of I/O commands, a directionality of the I/O command that indicates whether the I/O command is a read I/O command or a write I/O command.

3. The method of claim 2, further comprising:
determining, for each I/O command of the plurality of I/O commands, a size associated with the I/O command.

4. The method of claim 3, wherein the first interrupt time is determined based on:
the priority tier associated with the first I/O command,
the directionality associated with the first I/O command, and
the size of the first I/O command.

5. The method of claim 1, further comprising, subsequent to completing the first I/O command:
processing a second I/O command, wherein the second I/O command includes a lower priority I/O command associated with a lower priority tier.

6. The method of claim 5, further comprising:
determining a second interrupt time that indicates when a second completion interrupt for the second I/O command is to be generated, wherein the second interrupt time indicates that an acceptable delay can occur for an issuance of the second completion interrupt.

7. The method of claim 6, wherein the acceptable delay corresponds to a contractual timer value associated with the lower priority tier.

8. The method of claim 7, wherein the contractual timer value is based on a directionality of the second I/O command.

9. A user device, comprising:

at least one processor; and at least one memory storing instructions that, when executed by the at least one processor, cause the user device to:

receive a plurality of input/output (I/O) commands, wherein each I/O command of the plurality of I/O commands is associated with respective priority tier information;

determine, for each I/O command of the plurality of I/O commands, a respective priority tier for the I/O command based on the respective priority tier information associated with the I/O command; and when a first I/O command of the plurality of I/O commands is associated with a highest priority tier:
process the first I/O command, and
determine a first interrupt time that indicates a first completion interrupt for the first I/O command is to be generated independent of any pre-defined delay of time.

10. The user device of claim 9, wherein the at least one processor further causes the user device to:

determine, for each I/O command of the plurality of I/O commands, a directionality of the I/O command that indicates whether the I/O command is a read I/O command or a write I/O command.

11. The user device of claim 10, wherein a read I/O command is assigned a higher priority than a write I/O command.

12. The user device of claim 10, wherein the first interrupt time is determined based on the priority tier associated with the first I/O command and the directionality associated with the first I/O command.

13. The user device of claim 10, wherein the at least one processor further causes the user device to:

determine a size associated with the first I/O command, wherein the first interrupt time is determined based on:
the priority tier associated with the first I/O command,
the directionality associated with the first I/O command, and
the size of the first I/O command.

14. The user device of claim 9, wherein after completion of the first I/O command, the at least one processor further causes the user device to:

process a second I/O command, wherein the second I/O command includes a lower priority I/O command associated with a lower priority tier.

15. The user device of claim 14, wherein the at least one processor further causes the user device to:

determine a second interrupt time that indicates when a second completion interrupt for the second I/O command is to be generated, wherein the second interrupt time indicates that an acceptable delay can occur for an issuance of the second completion interrupt.

16. The user device of claim 15, wherein the acceptable delay corresponds to a contractual timer value associated with the lower priority tier.

17. The user device of claim 15, wherein the acceptable delay corresponds to an event that indicates that the at least one processor is no longer in a low power state.

18. A non-transitory computer readable storage medium configured to store instructions that, when executed by a processor included in a user device, cause the user device to dynamically determine an interrupt time, by carrying out steps that include:

receiving a plurality of input/output (I/O) commands, wherein each I/O command of the plurality of I/O commands is associated with respective priority tier information;

determining, for each I/O command of the plurality of I/O commands, a respective priority tier for the I/O command based on the respective priority tier information associated with the I/O command; and when a first I/O command of the plurality of I/O commands is associated with a highest priority tier:
processing the first I/O command, and
determining a first interrupt time that indicates a first completion interrupt for the first I/O command is to be generated independent of any pre-defined delay of time.

19. The non-transitory computer readable storage medium of claim 18, wherein the steps further include, subsequent to completing the first I/O command:

processing a second I/O command, wherein the second I/O command includes a lower priority I/O command associated with a lower priority tier.

20. The non-transitory computer readable storage medium of claim 19, wherein the steps further include:

determining a second interrupt time that indicates when a second completion interrupt for the second I/O command is to be generated, wherein the second interrupt time indicates that an acceptable delay can occur for an issuance of the second completion interrupt.

* * * * *